United States Patent [19]

McKay

[11] Patent Number: 4,552,056
[45] Date of Patent: Nov. 12, 1985

[54] MANUAL RELEASE AND AUTOMATIC RESET ARRANGEMENT FOR SPRING-APPLIED/AIR-RELEASED BRAKE

[75] Inventor: Albert A. McKay, Stoney Creek, Canada

[73] Assignee: WABCO Ltd., Hamilton, Canada

[21] Appl. No.: 686,051

[22] Filed: Dec. 24, 1984

[51] Int. Cl.$^4$ .......................... F01B 9/00; F01B 31/00
[52] U.S. Cl. ..................... 92/29; 92/130 A; 92/130 B; 188/170
[58] Field of Search ............. 92/63, 130 A, 29, 130 B; 188/170

[56] References Cited

U.S. PATENT DOCUMENTS

| | | | |
|---|---|---|---|
| 3,136,227 | 6/1964 | Williams | 92/63 |
| 4,080,875 | 3/1978 | Repolovsky et al. | 92/29 |
| 4,080,876 | 3/1978 | Sturgess et al. | 92/29 |
| 4,361,078 | 11/1982 | Cape et al. | 188/170 |
| 4,364,305 | 12/1982 | Dalibout et al. | 92/63 |
| 4,493,246 | 1/1985 | Dalibout | 92/29 |

Primary Examiner—Paul E. Maslousky
Attorney, Agent, or Firm—G. J. Falce

[57] ABSTRACT

An automatic reset arrangement for a manual release mechanism in a spring-applied, air-released brake comprising a sleeve member having axially projecting fingers that slide axially within the bore of the spring piston push rod. The ends of the projecting fingers are formed with outturned lugs having a conically-shaped surface adapted to engage a correspondingly-shaped shoulder in the bore of the piston push rod to provide a drive connection through which the spring brake force is transmitted to the sleeve member. A cylindrical plug member is normally arranged within the sleeve member at the flange end thereof to prevent inward deflection of the fingers and to thus maintain the integrity of the drive connection. A spring-returned, manually operable release lever is arranged to withdraw the plug member when it is desired to release the spring brake in the absence of air. Withdrawing the plug member allows the axial spring force acting through the conical drive surfaces to deflect the fingers radially inwardly to release the drive connection and accordingly permit the spring force to be dissipated. When air pressure is restored, the return spring of the manual release lever acting via the plug member forces the fingers radially outwardly to restore the drive connection.

12 Claims, 1 Drawing Figure

U.S. Patent  Nov. 12, 1985  4,552,056
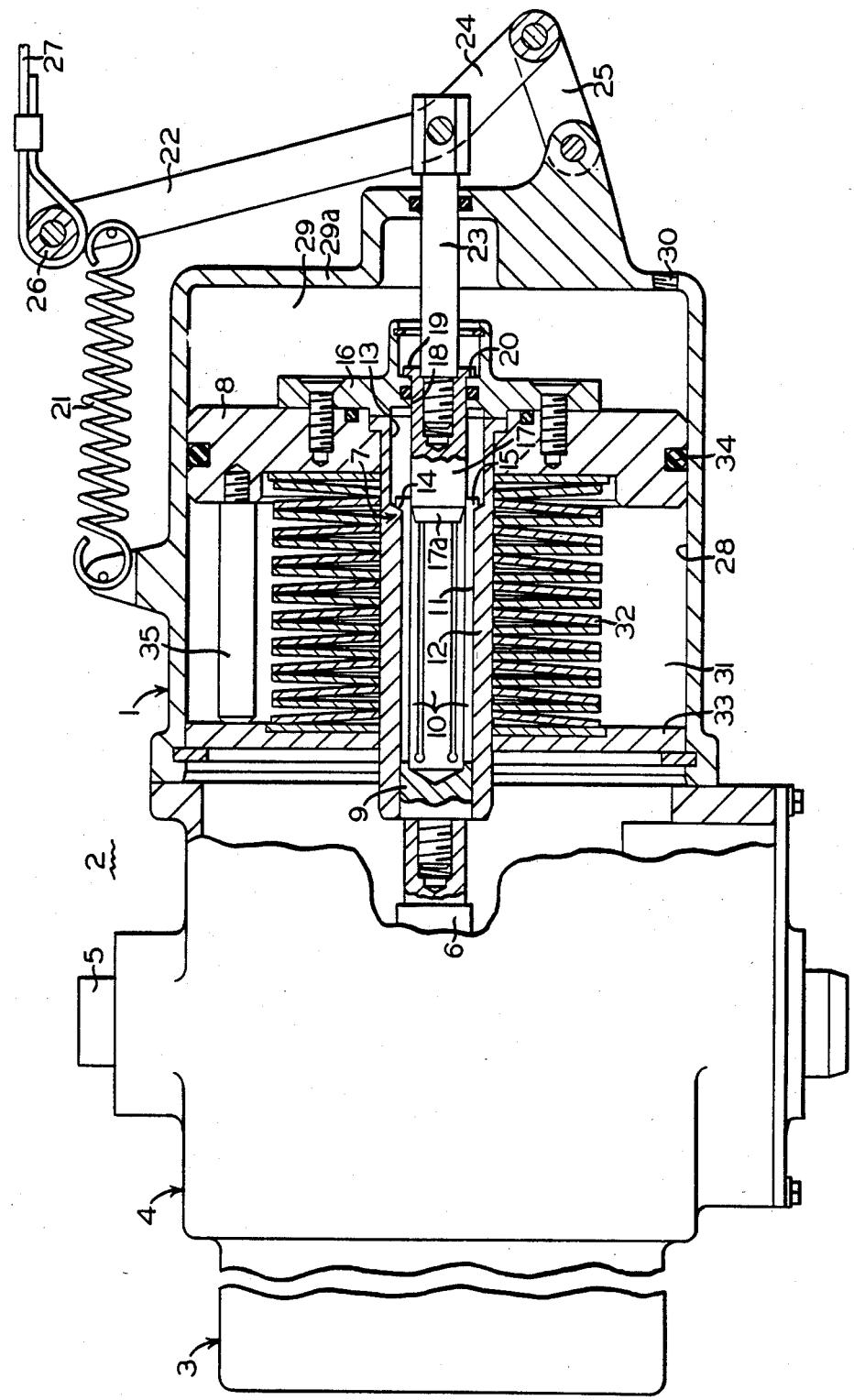

MANUAL RELEASE AND AUTOMATIC RESET ARRANGEMENT FOR SPRING-APPLIED/AIR-RELEASED BRAKE

BACKGROUND OF THE INVENTION

The present invention relates to brake actuators for transit-type railway vehicles and in particular to such brake actuators having a spring-applied, air-released auxiliary brake that can be utilized as a parking brake or as an emergency brake in conjunction with the service brake.

Spring-applied, air-released auxiliary brakes are automatically actuated with spring force when air pressure normally holding the spring in a retracted condition is accidentally released. In the case of a loss of braking pressure, due to a broken pipe, for example, the spring force is immediately available to effect a brake application, thereby providing a fail-safe emergency brake. In addition, when the brake pressure is purposely released, such as when draining the system to perform service or maintenance, for example, the spring brake is automatically actuated to provide a parking brake.

It has been long recognized, however, that once the air pressure is released, either purposely or by accident, the spring brake will remain applied until such time as air pressure is restored or the spring is retracted manually. It will be appreciated, therefore, that a manual release arrangement is necessitated with spring-applied, air-released auxiliary brake actuators to permit movement of a railway car that is otherwise rendered inoperative by the absence of air to release the spring-applied, air-released brake. A requirement of these manual release arrangements is that they be automatically reset when the supply of air is restored to retract the spring brake thereby assuring the integrity of the spring brake.

SUMMARY OF THE INVENTION

The object of the present invention, therefore, is to provide, in conjunction with a service brake actuator, an independent, spring-applied, air-released auxiliary brake actuator having a manual release mechanism that is easily actuated to effect a quick release of a spring-applied brake force.

Another object of the invention is to provide a manual release mechanism that automatically resets so that the reapplication of pneumatic pressure to retract the spring brake renders the auxiliary brake in a ready condition.

The following brief discussion covers a preferred embodiment of the invention in which an auxiliary brake module incorporating a spring brake piston is cooperatively arranged with a service brake module through the drive connection of the spring brake piston push rod with the intermediate shaft of the service brake module. This connection comprises a stepped bore formed within the spring brake piston push rod into which a plurality of axially elongated, flexible fingers extend from the end of the intermediate shaft. An outturned lug formed at the end of these fingers normally rests against a conforming shoulder formed by the stepped bore to transmit the spring force of the spring brake piston to the intermediate shaft during operation of the spring brake. The intermediate shaft fingers normally ride over a plug member disposed within the open end of the intermediate shaft fingers to support the flexible fingers against inward deflection, so that during actuation of the spring brake piston, the aforementioned drive connection is established.

In order to manually release this spring brake application, a release lever that is connected to the plug member is pulled to withdraw the plug member from its normal position inside the elongated flexible fingers of the intermediate shaft and thereby permit the fingers to be deflected inwardly by the axial spring force of the spring brake push rod acting through a tapered surface of the shoulder and a conforming tapered surface of the outturned lugs on the fingers, to thereby allow the shoulder to override the lugs normally constituting the drive connection of the spring brake with the service brake. Accordingly, the spring brake piston is driven by the brake actuator springs into engagement with the cylinder end wall to relieve the spring brake force.

A return spring on the release lever of the plug member urges the plug member toward engagement within the fingers so as to automatically restore the drive connection when the spring brake is retracted by the reapplication of pneumatic pressure to the spring brake piston.

BRIEF DESCRIPTION OF THE DRAWING

These objects and other features and advantages of the invention will become apparent from the following more detailed description, when taken with the accompanying single FIGURE drawing showing a partial assembly view of a railway-type brake unit with the emergency/parking brake portion incorporating the features of the invention in section.

DESCRIPTION AND OPERATION

Referring to the drawing, there is shown an emergency/parking brake module 1 of a brake cylinder device 2 of the type typically utilized on transit-type railway vehicles. Brake cylinder device 2 further includes a service brake module 3 and a central module 4 similar to the corresponding parts of the brake cylinder device shown in copending application, Ser. No. 601,479, filed April 18, 1984 and assigned to the assignee of the present invention. For an understanding of the present invention, it is only necessary to know that a brake actuator rod 5 of central module 4 is movable to operate either conventional brake shoes or disc brake pads in response to operation of either the service brake module 3 or the emergency/parking brake module 1. An intermediate actuator rod 6 is arranged to actuate brake rod 5 through an integral connection with the service piston (not shown) of the service brake module 3, and through a special drive connection 7 (hereinafter explained) that provides lost-motion with an auxiliary piston 8 of emergency/parking brake module 1.

Attached to intermediate rod 6, as by screw threads, is a sleeve member 9 comprising a plurality of axially elongated fingers 10. The outer periphery of these fingers engages the inside diameter of a through bore 11 of a push rod 12 to which auxiliary piston 8 is suitably connected for movement therewith. A counterbore 13 of through bore 11 forms a conically-shaped shoulder 14 with which an outturned lug 15 of the respective fingers 10 is normally engaged through a correspondingly-shaped mating surface of the lugs 15. Through bore 11 is closed at the end having counterbore 13 by a coverplate 16 that is bolted to piston 8, and by a cylindrical plug member 17. This plug member 17 has a tapered end 17a which projects into bore 11 and counterbore 13 via a circular opening 18 in coverplate 16.

Opening 18 is concentric with stepped bore 11, 13, and plug member 17 has a diameter corresponding to the diameter of opening 18 and of the opening in sleeve member 9. Plug member 17 is thus axially aligned to enter the opening in sleeve member 9 and to engage the inner surface of fingers 10. A flange 19 of plug member 17 is engageable with a stop shoulder 20 of coverplate 16 to limit leftward movement of plug member 17 and thus establish its normal position within the opening of fingers 10. Shoulder 20 is formed by a stepped bore, the lesser diameter of which is provided by opening 18. This normal position of plug member 17 is maintained by a tension spring 21 that is connected at one end to the housing of emergency/parking brake module 1 and to a fulcrum lever 22 having connected to it intermediate its ends a connecting rod 23 to which plug member 17 is in turn connected. One end 24 of fulcrum lever 22 is pivotally connected to the body of emergency/parking brake module 1, while the other end 26 of fulcrum lever 22 is connected to a cable 27 or the like.

Auxiliary piston 8 is slidably-disposed in the cylinder bore 28 of emergency/parking brake module 1 and forms, in conjunction with an end wall 29a, a pressure chamber 29 on one side having a fluid pressure inlet port 30 and a nonpressure chamber 31 on the opposite side. Contained within chamber 31 is a brake actuator spring 32 which, in practice, may be a pack of Belleville-type spring washers between piston 8 and an end wall 33 of chamber 31. A seal ring 34 surrounding the periphery of auxiliary piston 8 seals pressure chamber 29 from nonpressure chamber 31, while a limit pin 35 projects from the spring side of piston 8 for engagement with end wall 33. In the presence of fluid under pressure in chamber 29, piston 8 is forced leftwardly in cylinder bore 28 to compress brake spring 32 until pin 35 engages end wall 33 to thereby establish the release position of the emergency/parking brake.

During a service brake application, intermediate rod 6 is forced rightwardly in response to operation of the service brake module 3, as brake actuator rod 5 is concurrently extended in a brake application direction. This rightward movement of intermediate actuator rod 6 forces fingers 10 to slide axially in a rightward direction between the inside diameter of through bore 11 and the outer surface of plug member 17. This movement of intermediate rod 6 and thus sleeve member 9 results in lugs 15 of fingers 10 being shifted rightwardly away from tapered seat 14 to permit operation of the service brake without affecting the retracted position of piston 8.

The emergency/parking brake is actuated to application position by releasing the pneumatic pressure from chamber 29. As the force of brake actuator spring 32 exceeds the force of pressure acting on piston 8, the piston and push rod 12 are moved rightwardly. In the absence of a service brake application at this time, lugs 15 of fingers 10 will be in engagement with shoulder 14 and will thus be forced rightwardly with push rod 12 and piston 8 to in turn pull intermediate shaft 6 rightwardly and thereby operate brake actuator rod 5 to effect a brake application under the influence of brake actuator spring 32 acting through auxiliary piston 8.

In the event a service brake application is in effect at the time an emergency/parking brake application is initiated, the outturned lugs 15 of the respective fingers 10 will be displaced rightwardly a distance corresponding to the existing brake shoe clearance, it being understood that a slack adjuster device may be employed to maintain this clearance constant. As the pneumatic pressure is released from chamber 29, auxiliary piston 8 is forced rightwardly by actuator spring 32, carrying push rod 12 along with it over the outer periphery of fingers 10 until shoulder 14 engages lugs 15. This arrangement constitutes a lost-motion connection between push rod 12, sleeve member 9, and intermediate actuator rod 6.

Normally, the spring brake can be released by resupplying pneumatic pressure to chamber 29 via inlet port 30, which causes piston 8 to retract brake actuator spring 32 until limit pin 35, carried by piston 8, engages end wall 33. In this condition, the force of the pneumatic pressure in chamber 29 acting on piston 8 is greater than the opposing force of spring 32, so that no spring force is transmitted to brake rod 5.

When it is desired to release the spring-applied brake in the absence of pneumatic pressure, however, as in positioning or changing the location of a car along the siding or in a repair shop, for example, fulcrum lever 22 may be actuated rightwardly by a momentary pull on cable 27. As lever 22 is rotated about its pivotal connection at end 24, connecting rod 23 is likewise pulled rightwardly, whereby plug member 17 is withdrawn axially from its normal position within the open end of fingers 10. Due to the conical shapes of shoulder 14 and lugs 15 of fingers 10, the rightward acting spring force of piston 8 acting through push rod 12 deflects fingers 10 inwardly toward the axis of push rod 12 when plug member 17 is withdrawn from engagement with the inner periphery thereof. This inward deflection of fingers 10, allows shoulder 14 to ride over finger lugs 15, whereby the force of spring 32 is effective to drive piston 8 into engagement with end wall 29a. Thus, spring 32 is caged between the respective end walls 29a and 33 of emergency/parking brake module 1, thereby removing the spring force from sleeve member 9, intermediate rod 6 and brake actuator rod 5. Immediately upon releasing cable 27, spring 21 is effective to pull lever 22, connecting rod 23, and plug member 17 leftwardly until the tapered end 17a abuts the adjacent end of fingers 10. Due to the fact that fingers 10 are now deflected inwardly, with lugs 15 being engaged with bore 11, plug member 17 is prevented from reentering the opening within fingers 10 and is maintained in this position under tension of spring 21. In this manner, the emergency/parking brake is released manually and the release mechanism is automatically conditioned to be reset as now explained.

The release mechanism, i.e. plug member 17 is reset when pneumatic pressure is resupplied to chamber 29 via port 30 to force piston 8 leftwardly in order to retract spring 32. As this occurs, shoulder 14 of push rod 12 will be shifted leftwardly relative to lugs 15 of fingers 10 to allow the finger lugs 15 to expand outwardly into counterbore 13. This outward deflection of fingers 10 is encouraged by the fact that the tapered end 17a of plug member 17 is acting axially against the adjacent end of fingers 10 under the tension of spring 21. Once fingers 10 have been reset in their normal position, finger lugs 15 are reengaged with shoulder 14 and plug member 17 is free to reenter fingers 10 of sleeve member 9 under the influence of spring 21, thereby preventing further inward deflection of fingers 10. Thus, the drive connection between push rod 12 and sleeve member 9 is automatically reestablished and the spring brake force is again capable of being transmitted to brake actuator rod 5 when an emergency/parking brake application is required.

Having now described the invention, what I claim as new and desire to secure by Letters Patent, is:

1. A spring-applied, fluid pressure released emergency/parking brake unit comprising:
   (a) a cylinder;
   (b) a piston operably disposed within said cylinder for axial movement therein;
   (c) an actuating spring arranged in said cylinder to exert a force on said piston in a brake application direction;
   (d) said cylinder including an end wall, said cylinder and said end wall cooperating with said piston to form a chamber pressurization of which exerts a counteracting force on said piston in a brake release direction;
   (e) a push rod connected at one end to said piston, said push rod having a first stepped bore there through in which a first shoulder is formed;
   (f) an actuating rod disposed in said first stepped bore having one end projecting from said push rod and the other end forming a flexible sleeve, said sleeve having an outturned lug engageable with said first shoulder, the engageable surfaces between said first shoulder and said lug having an angle of inclination with the axis of movement of said piston so as to exert an inwardly acting force on said flexible sleeve when said piston is actuated in said brake release direction;
   (g) a cylindrical plug member carried by said piston and having a normal position in which at least one end thereof is disposed within said flexible sleeve to support said sleeve against deflection in response to said inwardly acting force exerted thereon, thereby maintaining said lug engageable with said first shoulder, whereby the force of said actuating spring is transmitted to said actuating rod via said first shoulder and said lug; and
   (h) manual release means connected to the other end of said plug member for axially displacing said lug member from said normal position to a release position without said flexible sleeve member to permit said deflection of said flexible sleeve member sufficiently to disengage said lug from said first shoulder and thereby interrupt said transmission of said spring force to said actuating rod.

2. The brake unit, as recited in claim 1, further characterized in that said spring is effective to force said piston into engagement with said end wall of said cylinder when said lug is disengaged from said first shoulder, whereby the force of said spring is transferred from said actuating rod to said cylinder.

3. A brake unit, as recited in claim 1, further comprising spring means for urging said plug member toward said normal position, said one end of said plug member being tapered to urge said flexible sleeve member outwardly upon engagement of said one end of said plug member with said sleeve member when said sleeve member is in said deflected condition, thereby automatically reestablishing engagement between said shoulder and said lug following movement of said piston in said release direction.

4. A brake unit, as recited in claim 3, wherein said flexible sleeve member comprises a plurality of elongated fingers, each having said lug, the outer surface of which is engageable with said first stepped bore at a lesser diameter thereof and the inner surface of which is engageable with the outer surface of said plug member, whereby said sleeve member is guidably supported for axial movement in said brake application and brake release directions when said plug member is in said normal position.

5. A brake unit, as recited in claim 4, further characterized in that said lugs are axially displaceable from engagement with said first shoulder within a greater diameter area of said first stepped bore to permit axial movement of said actuating rod in said brake application direction independently of movement of said piston.

6. A brake unit, as recited in claim 5, further characterized in that said piston is provided with an opening therein coaxially aligned with said first stepped bore and opening thereinto to guidably receive said plug member.

7. A brake unit, as recited in claim 6, wherein said piston comprises a cover plate fixed to the side of said piston within said pressure chamber, said cover plate having a second stepped bore therethrough providing said opening in said piston.

8. A brake unit, as recited in claim 7, wherein said plug member includes a flange that is engageable with a second shoulder formed within said second stepped bore to limit axial movement of said plug member by said spring means to establish said normal position of said plug member.

9. A brake unit, as recited in claim 8, wherein said cover plate includes a retainer ring in said stepped bore at the greater diameter thereof to limit said axial displacement of said plug member by said manual release means from said normal position.

10. A brake unit, as recited in claim 7, further characterized in that the lesser diameter of said second stepped bore is the same dimension as the diameter of the inner surface of said plurality of fingers.

11. A brake unit, as recited in claim 3, wherein said end wall includes an opening therein, and said manual release means comprises:
    (a) a fulcrum lever;
    (b) a connecting rod slidably disposed in said opening in said end wall and having one end connected to said other end of said plug member and the other end connected to said fulcrum lever at a point intermediate the ends thereof; and
    (c) a link pivotally connected at one end thereof to said cylinder and at the other end thereof to one end of said fulcrum lever.

12. A brake unit, as recited in claim 11, wherein said spring means comprises a tension spring connected between said cylinder and a point on said fulcrum lever intermediate the other end thereof and said connection of said connecting rod therewith.

* * * * *